H. TIEGS & S. W. PALMER.
TRACK SCALE.
APPLICATION FILED OCT. 20, 1915.
1,194,576.
Patented Aug. 15, 1916.
3 SHEETS—SHEET 1.
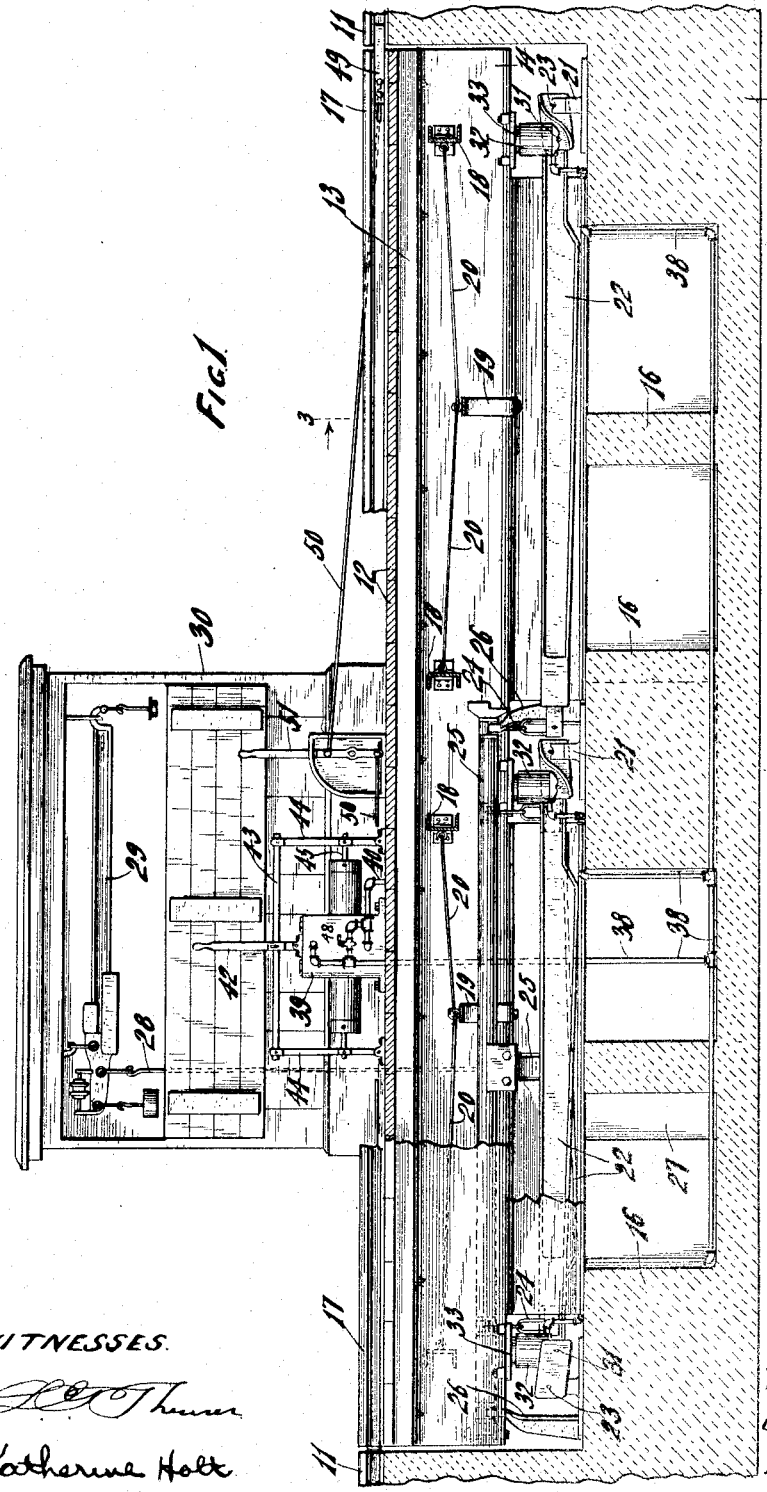
WITNESSES.
INVENTORS

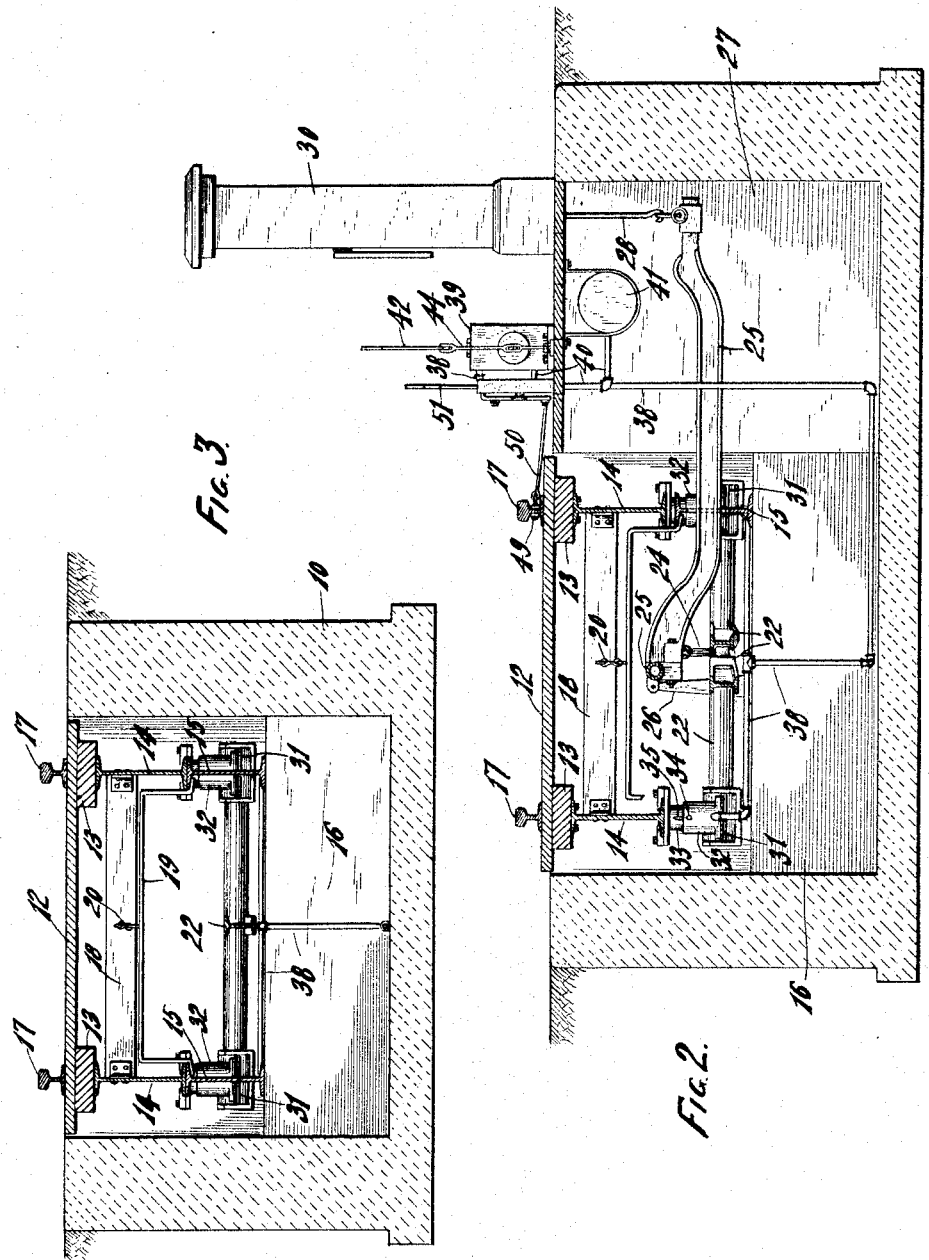

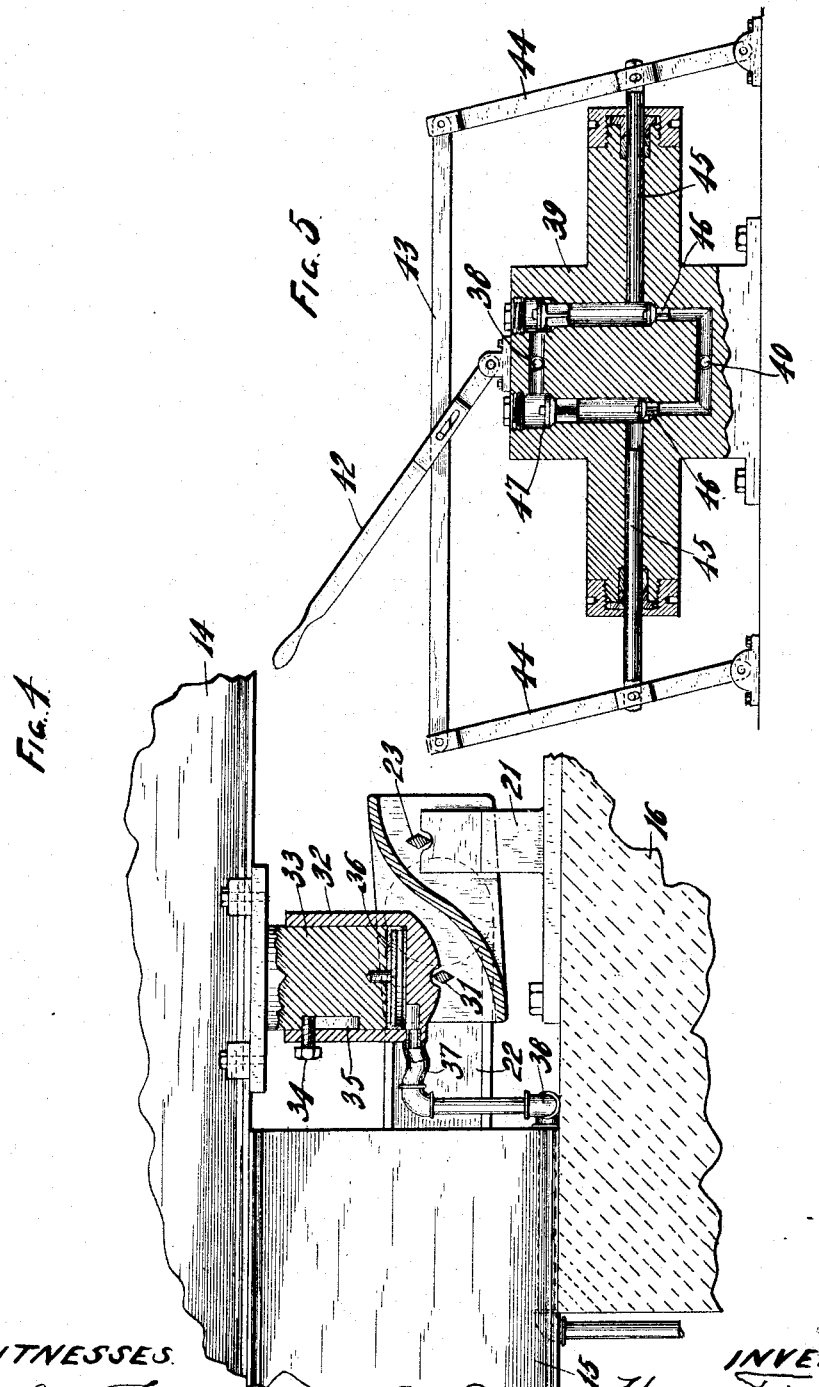

UNITED STATES PATENT OFFICE.

HENRY TIEGS AND SCOTT W. PALMER, OF MILWAUKEE, WISCONSIN.

TRACK-SCALE.

1,194,576.  Specification of Letters Patent.  Patented Aug. 15, 1916.

Application filed October 20, 1915.  Serial No. 56,826.

*To all whom it may concern:*

Be it known that we, HENRY TIEGS and SCOTT W. PALMER, citizens of the United States, and residents of Milwaukee, in the county of Milwaukee and State of Wisconsin, have invented new and useful Improvements in Track-Scales, of which the following is a description, reference being had to the accompanying drawings, which are a part of this specification.

This invention has for its object to provide a scale for weighing railway cars and the contents thereof, without the necessity for the provision of dead rails, or rails adjacent to the scale rails, on which the locomotive may travel without subjecting the scale mechanism to the weight of the locomotive.

Another object of the invention is to provide a track scale in which the scale rails may be used by the locomotive without subjecting the scale mechanism to the weight thereof, and with this end in view the invention comprises a track scale in which the scale rails are normally supported independently of the scale mechanism, but which by the operation of suitable jacks, such as hydraulic jacks, the said scale rails and the weight resting thereon may be lifted onto the scale mechanism so as to be weighed thereby.

Another object of the invention is to provide suitable means for quickly supplying a liquid medium under pressure to such hydraulic jack mechanism and for withdrawing it therefrom.

With the above and other objects in view the invention consists in the track scale as herein claimed, and all equivalents.

Referring to the accompanying drawings, in which like characters of reference indicate the same parts in the different views, Figure 1 is a longitudinal sectional view, with parts broken away, of a track scale constructed in accordance with this invention; Fig. 2 is a transverse sectional view thereof near the center; Fig. 3 is a transverse sectional view thereof on the plane of line 3—3 of Fig. 1; Fig. 4 is a detail sectional view of one of the hydraulic jacks; and, Fig. 5 is a detail sectional view of the double acting oil pump for supplying oil to the jacks.

In these drawings 10 indicates a foundation, which is preferably of cement construction, having the ends of the railway rails 11 mounted in place thereon, and such foundation between the ends of these rails forming a pit for containing the scale structure. The pit is covered by a platform 12, preferably formed of boards laid crosswise of the pit and secured to sills 13 running lengthwise of the pit, and supported by I-beams 14 which normally rest upon stationary I-beams 15 which are embedded in or otherwise fixed in place on cross walls 16 of the foundation 10. The stationary beams 15 are preferably formed in sections, one section being provided for each scale unit, and the number of scale units depending upon the length of the pit, though the platform beams 14 are preferably of one-piece construction extending the full length of the pit, and are directly beneath the scale rails 17 which are secured to the platform in continuation of the railway rails 11. Thus, as shown in Fig. 1, the weight of the car standing on the scale rails 17 is directly supported from the foundation by the platform beams 14 resting upon the stationary supporting beams 15, although the platform including the platform beams 14, may be raised by means of suitable jacks so as to take the weight from the stationary beams 15 and impose it upon the scale levers which support said jacks. The two beams 14 are connected by cross-pieces 18 to form a rigid rectangular frame for the platform, and this frame is guided in its vertical movements against displacement, either laterally or longitudinally, by inverted U-shaped braces 19 which connect the stationary beams 15 together by having their ends secured to the under surface of the beam heads, and which extend vertically in line with the inner edges of the base flanges of beams 14 to prevent the lateral displacement of said beams, while tie rods 20 connect said braces 19 with the cross-pieces 18 to prevent longitudinal displacement of the platform frame.

Suitable standards or supports 21 are mounted on the cross walls 16 of the foundation between the ends of the supporting beams 15 at the middle portions of the pit and beyond the ends of said beams at the ends of the pit, and T-shaped scale levers 22 are pivotally mounted on these supports by having knife edges 23 at the ends of their cross arms bearing in knife edge seats in the upper ends of said supports. The outer ends of the scale levers 22 are connected by links 24 with a T-shaped shelf lever 25 which has its cross arms pivotally mounted in knife edge bearings on standards 26 standing up from the cross walls 16 of the foundation. The cross arms of the shelf lever 25 extend longitudinally of the pit and the stem portion of said lever passes through an opening in the web of one of the supporting beams 15 into a side extension 27 of the pit, where it is connected by a link 28 with a scale beam 29 contained within a suitable cabinet 30 above the ground. Each of the scale levers 22 is also provided with a knife edge 31 at the ends of its cross arms, and seated on these knife edges are the cylinder members 32 of hydraulic jacks, the plunger members 33 thereof being secured to the lower edges of the platform beams 14. Guide screws 34 are threaded through the side walls of the cylinders 32 and project into guide slots 35 of the plunger members 33 to prevent the turning of the cylinders on the plungers, and the plunger members have suitable cup washers 36 at their lower ends to maintain a tight fit with the walls of the cylinders. The lower ends of the cylinders 32 have flexible tubular connections 37 with a system of piping 38 which connects with a double acting oil pump 39, shown in detail in Fig. 5. This pump has a pipe connection 40 with an oil supply tank 41, and a handle lever 42 pivotally mounted on the top of the pump casing and connected by a horizontal link 43 with suitably mounted levers 44 causes the reciprocation of plungers 45 to lift the oil from the oil reservoir through the pipe 40 and past the foot valves 46, and forces it upwardly past the check valves 47 into the pipes 38, and thence to the several cylinders 32 of the hydraulic jacks.

In operation the car to be weighed is run onto the scale rails 17 while the parts are in their normal position, with the platform beams 14 resting on the supporting beams 15, and then the oil pump 39 is operated to force the oil into the several jacks, causing the pistons thereof to rise and lift the entire platform with the car, thus placing the weight of the car and the platform on the scale mechanism, the swinging movement of the scale levers 22 being imparted to the shelf lever 25 and through the link connection 28 to the scale beam 29. When the weight of the car has been taken the platform is lowered by allowing the return of the oil to the oil reservoir, there being a valved by-pass 48 connecting the pipes 38 with the pipe 40 for this purpose. When the platform has lowered to its stationary support the car is removed therefrom, and while the platform is in its lowered position the ends of the scale rails 17 may be locked with the ends of the track rails 11 by means of sliding splice bars 49 connected by links 50 with a lever 51.

By means of this invention the scale mechanism is entirely relieved of the weight of a locomotive or cars passing over the scale rails while the jacks are released, and is not subject to injury thereby, and it is not necessary to provide the usual dead rails alongside of the scale rails with the accompanying switch mechanism. This permits of a much less expensive installation and avoids the possibility of damage through mistake in running the heavy locomotive over the scale rails.

Obviously other jack mechanism may be employed without departing from the invention, but the hydraulic jack mechanism is preferable as being most flexible.

What we claim as new and desire to secure by Letters Patent is:

1. A track scale, comprising scale rails, a stationary support therefor, scale mechanism, and hydraulic jacks on the scale mechanism between the scale rails and the scale levers for lifting the scale rails off of the stationary support and thereby imposing the weight of the scale rails and their burden upon the scale mechanism.

2. A track scale, comprising scale rails, a stationary support therefor, a scale mechanism, hydraulic jacks mounted on the scale mechanism between the scale rails and the scale levers for lifting the scale rails off of the stationary support, and a liquid pump connected with the several hydraulic jacks for operating them to lift the weight of the scale rails and their burden off of the stationary support.

3. A track scale, comprising a foundation forming a pit with cross walls at intervals, standards mounted on the cross walls, scale levers pivotally mounted on the standards, a shelf lever pivotally mounted on standards and having the scale levers connected therewith, a scale beam connected with the shelf lever, stationary supporting beams extending lengthwise of the pit and seated on the cross walls of the foundation, movable beams adapted to rest on the stationary beams, a platform mounted on the movable beams, scale rails on the platform above the movable beams, track rails at the ends of the pit in alinement with the scale rails, hydraulic jacks connecting the scale levers with the movable beams, and a liquid pump connected with the hydraulic jacks.

4. A track scale, comprising a foundation forming a pit with cross walls at intervals, standards mounted on the cross walls, scale levers pivotally mounted on the standards, a shelf lever pivotally mounted on standards and having the scale lever connected therewith, a scale beam connected with the shelf lever, stationary supporting beams extending lengthwise of the pit and seated on the cross walls of the foundation, movable beams adapted to rest on the stationary beams, cross pieces connecting the movable beams, inverted U-shaped guides connecting the stationary beams and engaged by the movable beams to prevent lateral displacement of the movable beams, links connecting the cross pieces with the guides for preventing longitudinal displacement of the movable beams, a platform mounted on the movable beams, scale rails on the platform above the movable beams, track rails at the ends of the pit in alinement with the scale rails, hydraulic jacks connecting the scale levers with the movable beams, and a liquid pump connected with the hydraulic jacks.

5. A track scale, comprising stationary supports, movable beams adapted to rest on the stationary supports, scale rails carried by the movable beams, suitably mounted scale levers, knife edges thereon, cylinders seated on the knife edges, plungers fitting in the cylinders and secured to the movable beams, flexible tubes connected with the cylinders, and a pipe system for liquid under pressure connected with the flexible tubes.

In testimony whereof, we affix our signatures, in presence of two witnesses.

HENRY TIEGS.
SCOTT W. PALMER.

Witnesses:
R. S. C. CALDWELL,
KATHERINE HOLT.

Copies of this patent may be obtained for five cents each, by addressing the "Commissioner of Patents, Washington, D. C."